United States Patent [19]

Herrera

[11] Patent Number: 4,825,669

[45] Date of Patent: May 2, 1989

[54] WHEEL LUG NUT COVER

[76] Inventor: Ernest Herrera, 11608 Everest St., Norwalk, Calif. 90650

[21] Appl. No.: 6,112

[22] Filed: Jan. 23, 1987

[51] Int. Cl.$^4$ .................... B65D 55/14; E05B 65/12
[52] U.S. Cl. ......................... 70/163; 70/166; 70/232; 70/260
[58] Field of Search ............... 70/229–232, 70/158, 163, 164, 166–173, 259, 260; 301/37 R, 37 AT, 37 SC, 37 S; 411/177, 178, 180, 908, 82

[56] References Cited

U.S. PATENT DOCUMENTS

| | | | |
|---|---|---|---|
| 2,291,217 | 7/1942 | Hoecker | 70/260 X |
| 2,315,963 | 4/1943 | Jandus | 70/167 |
| 2,535,126 | 12/1950 | Flowers et al. | 70/169 |
| 2,722,822 | 11/1955 | Thomas | 70/167 |
| 2,874,561 | 11/1957 | Alger | 70/169 |
| 2,896,440 | 11/1957 | Romsteadt, Jr. | 70/258 |
| 3,170,733 | 2/1965 | Lamme | 301/37 |
| 3,213,210 | 10/1965 | Samples | 70/168 X |
| 3,248,915 | 5/1966 | Scheiman | 70/168 |
| 3,296,842 | 1/1967 | Auerbach et al. | 70/163 X |
| 3,336,771 | 8/1967 | Selleck | 70/259 |
| 3,534,570 | 10/1970 | Mauro | 70/167 |
| 3,833,266 | 9/1974 | Lamme | 70/259 X |
| 3,918,764 | 11/1975 | Lamme | 70/259 X |
| 3,964,531 | 6/1976 | Schenk | 411/82 |
| 3,965,708 | 6/1976 | Smiley | 70/166 |
| 4,161,869 | 7/1979 | Dixon | 70/166 |
| 4,217,002 | 8/1980 | Simpson | 301/37 S X |
| 4,346,940 | 8/1982 | Tatar | 301/37 |
| 4,441,762 | 4/1984 | Segal | 301/37 S X |
| 4,446,185 | 5/1984 | Waragai et al. | 411/908 X |
| 4,478,458 | 10/1984 | Flexman | 301/9 |
| 4,659,258 | 4/1987 | Scott | 411/82 X |
| 4,723,818 | 2/1988 | Beisch et al. | 301/37 SC X |
| 4,729,604 | 3/1988 | Dietz | 301/37 R |
| 4,729,705 | 3/1988 | Higgins | 411/180 X |
| 4,759,670 | 7/1988 | Linder et al. | 411/908 X |

FOREIGN PATENT DOCUMENTS

| | | | |
|---|---|---|---|
| 1160262 | 1/1984 | Canada | 301/37 AT |
| 2828104 | 10/1980 | Fed. Rep. of Germany | 301/37 |
| 621667 | 2/1927 | France | 70/259 |
| 942489 | 2/1949 | France | 70/259 |
| 414845 | 8/1946 | Italy | 70/259 |
| 2046185 | 11/1980 | United Kingdom | 301/37 |

OTHER PUBLICATIONS

Popular Mechanics, Sep. 1942, p. 16.

Primary Examiner—Robert L. Wolfe
Assistant Examiner—Suzanne L. Dino
Attorney, Agent, or Firm—Howard A. Kenyon

[57] ABSTRACT

A locking assembly for fastening a lug not cover on a vehicle wheel secured to a vehicle is disclosed. The mounting bracket and the lug nut cover both have elongated holes which makes them universal and allows them to fit a large number of lug bolt spacings measured from the center of the axle to the center of the lug bolt. A lug nut cover is fitted onto special lug nuts containing an extension to the lug nut. This mounting bracket which extends through the center of the wheel communicates with the locking mechanism thereby holding the lug nut cover firmly in place.

7 Claims, 1 Drawing Sheet

U.S. Patent    May 2, 1989    4,825,669
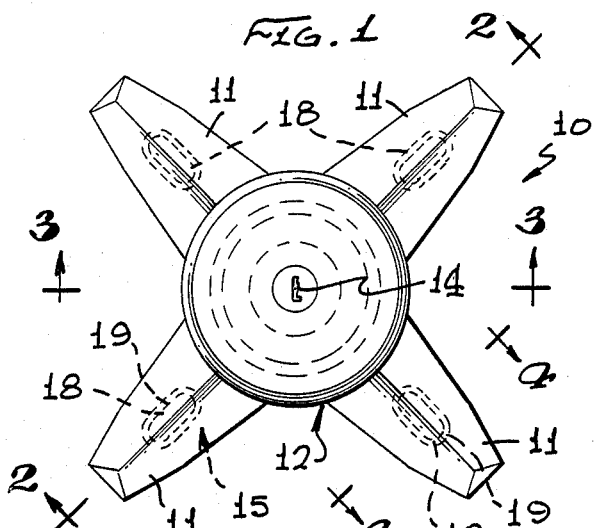
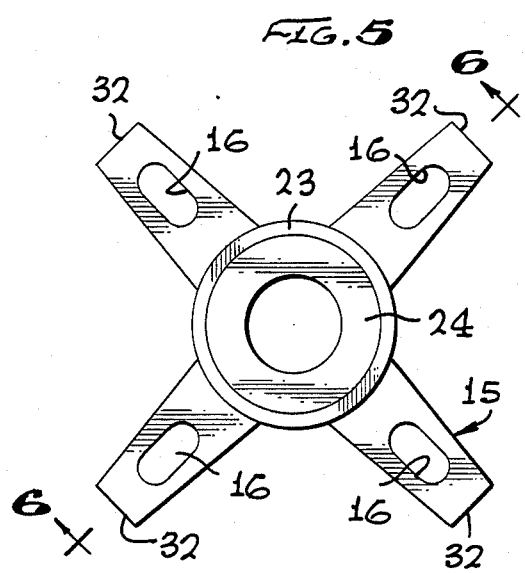
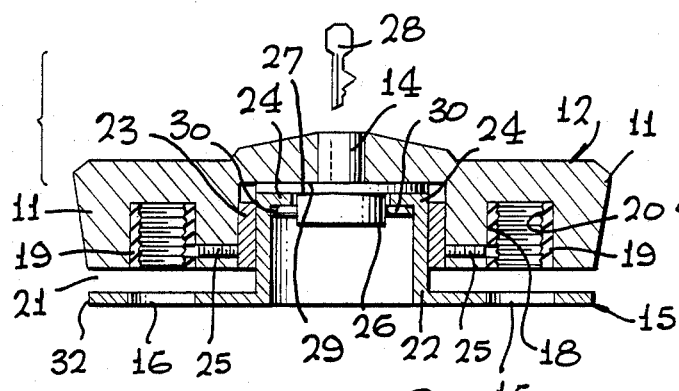
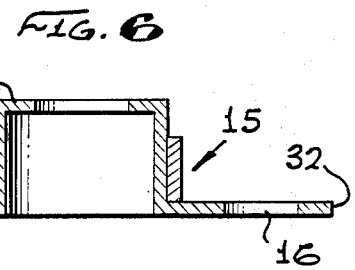
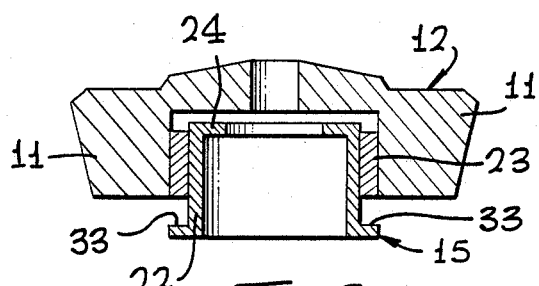
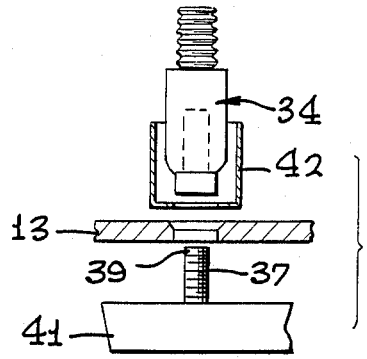
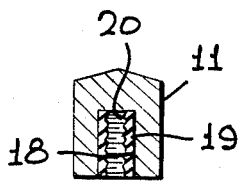
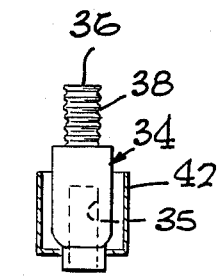
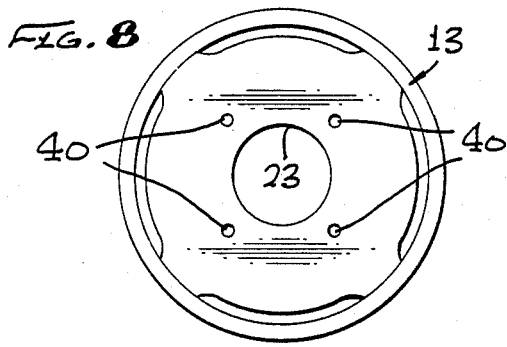

WHEEL LUG NUT COVER

BACKGROUND OF THE INVENTION

1. Field of the Invention

This invention is generally directed to a locking assembly for fancy wheels to prevent theft and more particularly to an economical locking assembly that is universal and not dedicated to a specific vehicle.

2. Description of the Prior Art

The vehicle or automobile wheel has over the years become part of the styling of the automobile and not just a member to hold on a tire. These type of fancy wheels were in the beginning known as "mag" wheels which is an abbreviation for "magnesium" wheels. These "mag" wheels were used on some race cars. However, since a wheel manufactured from magnesium is costly and not practical for the average consumer, the fancy wheels for general use are actually made from aluminum or chrome plated steel.

The cast aluminum and chrome plated steel fancy wheels are sold at tire and wheel shops all over the world and since the wheels are a luxury item, they are a prime candidate for thefts.

There have been many attempts to provide a locking hubcap that covers the lug nuts to prevent a theft of vehicle wheels.

One such patent is U.S. Pat. No. 2,722,822 to Thomas. Thomas describes a circular wheel cover that fits over all the lug nuts. A bracket is fitted over three of the lug nuts with a threaded stud extending outward from the center of the bracket. A lock assembly which is screwed on the stud, holds the circular wheel cover in place.

Another patent is U.S. Pat. No. 2,874,561 to Algu. This patent shows a wire placed under two of the lug nuts with a tang fixed to the wheel cover to secure the cover. A locking keyed system prevents removal of the cover.

Another locking hubcap is described by U.S. Pat. No. 2,896,440 to Romsteadt Jr. This patent shows three of the lug nuts having a bolt head protruding therefrom. A locking keyed system turns a three prong metal clip that fits under the bolt heads and holds the cover in placed.

Another wheel cover with locking means is described by U.S. Pat. No. 3,170,733 to Lamme. Lamme has a member that is fastened under the lug nuts. This member has internal threads in the center which accepts external threads attached to a locking device which is further attached to a wheel cover.

Still a further wheel cover is U.S. Pat. No. 4,346,940. This system has a support member fastened under the lug nuts. A threaded nylon bolt is fastened through the support member and locked to the outer part of the rim.

Another cover is described in U.S. Pat. No. 4,478,485. This patent describes a complex system for wire wheels that does not disclose a keyed locking means.

U.K. Pat. No. 2,046,165. This patent describes a wheel hub cover with detents in a locking plug that can be adjusted for various hub configurations.

German Pat. No. 28 28 104. This system describes a wheel hub specifically designed for the lug nut cover which contains tangs controlled by the key lock.

Almost all of the above prior art has a shortcoming that the locking assemly be designed for one specific lug bolt spacing. The present invention overcomes this shortcoming by providing elongated slots in the mounting bracket and elongated slots in the lug nut cover that will fit almost all of the present lug bolt spacings measured from the center of the wheel to the center of the lug bolt. The only requirement for the present lug nut cover designed is a unique assembly dedicated to the number of lug bolts on a given wheel. The present invention would have a separate cover for a 4, 5 and 6 lug bolt wheel, however, as previously stated, the variation in distance from the center of the wheel to the center of the lug nut would be accepted by the elongated slots in both the mounting bracket and the lug nut cover. The present invention provides an economical means of providing an attractive locking assembly on a vehicle wheel.

SUMMARY OF THE INVENTION

It is the primary object of this invention to provide a locking assembly on a vehicle wheel to prevent vehicle wheel theft.

It is another object of this invention to provide a lug nut cover that will fit a multiple of lug bolt spacings and lengths.

It is yet another object of this invention to provide a lug nut cover that will not have any sideways movement.

It is still another object of this invention to provide an economical locking assembly.

Briefly, in accordance with the invention there is provided a mounting bracket that fits between the vehicle wheel and the vehicle. The mounting bracket contains elongated slots to fit a plurality of lug bolt spacings. The vehicle wheel is placed over the lug bolts with the center of the mounting bracket protruding through the hole in the center of the wheel. Special lug nuts with an extension on the top of the nuts are used to fasten the wheel to the vehicle with a portion of the mounting bracket firmly secured therebetween.

A lug nut cover that also contains elongated slots on the bottom of the lug nut cover is placed on the lug nut extensions and firmly fitted into the flexible liner contained in the elongated slots of the lug nut covers. A circular sleeve is placed between the mounting bracket and the lug nut cover which in turn is held in place by two set screws accessible from the elongated slots in the lug nut cover. A suitable bonding agent can also be used to hold the circular sleeve in place. A keyed locking assembly is locked in place in the center of the mounting bracket that holds the lug nut cover securely in place which in turn prevents theft of the vehicle's wheels.

The novel features which are believed to be characteristics of the invention, both as to its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 1 shows a top view of the lug nut cover and mounting bracket combination.

FIG. 2 is a sectionalized view of the lug nut cover, the mounting bracket and the lock assembly taken on line 2—2 of FIG. 1.

FIG. 3 is another cross section view of the mounting bracket and lug nut cover and circular sleeve, taken on line 3—3 of FIG. 1.

FIG. 4 is a cross section of one of the arms of the lug nut cover showing a cross section of the flexible insert containing grooves, taken on line 4—4 of FIG. 1.

FIG. 5 is a top view of the mounting bracket.

FIG. 6 is a cross section view of the mounting bracket showing elongated holes taken along line 6—6 of FIG. 1.

FIG. 7 is a side view of the special lug nut used with this invention showing the lands on the lug nut extension.

FIG. 8 is a front view of a typical vehicle wheel.

FIG. 9 is a sectional view showing the special lug nut, a portion of the vehicle wheel and a lug bolt mounted on a portion of the vehicle.

While the invention will be described in connection with the preferred embodiments, it will be understood that it is not intended to limit the invention to those embodiments. On the contrary, it is intended to cover all alternatives, modifications, and equivalents that may be included within the spirit and scope of the invention as described by the appended claims.

DETAILED DESCRIPTION OF THE PREFERRED EMBODIMENT

Turning now to FIG. 1 there is seen a locking assembly 10, having four arms 11, consisting of a combination of lug nut cover 12 and an internal lock 14. The assembly 10 is designed for a vehicle hub 13 shown in FIG. 8 with a four lug bolt pattern, although a five or six lug bolt pattern (not shown) will be identical in construction to assembly 10 except the cover 12 will have one or two additional arms. The lug nut cover 12 and arms 11 in the preferred embodiment are made from a noncorrosive metal, however, any suitable noncorrosive material such as plastic can be used.

Turning now to FIG. 2, there is shown a cross section of two arms 11 and internal lock 14. FIG. 2 also presents a cross section of mounting bracket 15 which is placed behind the vehicle wheel (not shown) and protrudes into the lug nut cover 12. The mounting bracket 15 contains an elongated hole 16 in the mounting bracket 15 that is aligned with elongated slot 18 in the lug nut cover arm 11. A cross section of flexible material 19 containing internal grooves 20 fitted in the elongated slot 18 can also be seen in this view. Also, as shown in FIG. 2, the vehicle wheel (not shown) will fit in the space 21 between the mounting bracket 15 and the lug nut cover arm 11. The portion 22 of the mounting bracket 15 has a circular sleeve 23 fitted around the outside of mounting bracket 15 which is also fitted on the inside of lug nut cover 12. The circular sleeve is held in place by two set screws 25 or bonded with a suitable bonding agent. The mounting bracket 15 also has an edge 24 that is turned inward on the top of the mounting bracket portion 22 that also extends through the center portion of the vehicle wheel 17.

Also shown in FIG. 2 is locking means 26 that is not unlike a gas cap lock on a gas tank for a vehicle. Locking means 26 is fitted and bonded to the lug nut cover 12 by surfaces 27 of locking means 26 being bonded to surfaces 29 on lug nut cover 12. The preferred embodiment is bonding, however, other fastening means such as bolts or screws could also be used. Bonding may be done by any acceptable means such as an adhesive or glue which will withstand adverse environmental conditions. The locking mechanism (not shown) in locking means 26 is activated by a key 28 in internal lock 14, and when the key 28 is turned, the locking mechanism activates tangs 30 which move linearly. These tangs 30 are spring biased which will insure that the tangs 30 will always be in the extended position as shown in FIG. 2. When tangs 30 are placed underneath mounting bracket edges 24 locking means 26 holds lug nut cover 12 securely against the lug nut extensions 36, which are shown in FIG. 7.

FIG. 3 shows an additional cross section of the combination lug nut cover 12 and the mounting bracket 15 without the locking means 26. Also shown is mounting bracket portion 22 which extends through the center of the vehicle wheel (not shown). The edges 24 that receive the tangs 30 of locking means 26 are also shown. FIG. 3 also shows the circular sleeve 23 fitted between the lug nut cover 12 and the mounting bracket 15 which is used to cover the gap between the wheel 13 and the lug nut cover 12.

FIG. 4 presents a cross section of an arm 11 showing the flexible material 19 containing grooves 20 fitted into the elongated slot 18. It is not that the flexible material 19 has an elliptical shape (as seen in FIG. 1) to accommodate multiple spacing of lug bolts spacings measured from the center of the vehicle wheel to the center of the lug bolt.

Turning now to FIG. 5, there is seen a top view of the mounting bracket 15. In the preferred embodiment the elongated holes 16 are enclosed, however, the mounting bracket can be manufactured without arms 32 as the compressive force against mounting bracket surface 33 (shown in FIG. 3) resulting from the vehicle wheel being tightened against the vehicle is sufficient to hold the mounting bracket in place.

FIG. 6 shows a cross section view along the arms 32 of the mounting bracket 15 with elongated holes 16. The portion of the mounting bracket 22 extending through the center of the wheel and the edges 24 of the mounting bracket turned inward is also seen by this view.

FIG. 7 shows the special lug nut 34 that is required with this invention. The lug nut 34 has internal threads 35 that mate with the threads 37 on the lug bolts 39 (shown in FIG. 9). An extension 36 on the top of the lug nut 34 provides a member that communicates with the lug nut elongated slot 18. It is noted that the extension 36 to the lug nut 34 is sized such that a firm fit is obtained with flexible material 19. In this manner there is no sideways movement when the locking assembly 10 is in place. It is noted that there are ridges 38 on the lug nut extension 36 and grooves 20 in the slot 18 of the lug nut cover 12. When the lug nut extension 36 is forced into the elongated slot 18 of lug nut cover arm 11, the flexible material in slot 18 containing grooves 20 will tend to fit with the ridges 38 on two sides of the lug nut extension 36 and hold the lug nut extension 36 firmly in place. FIG. 7 also shows a tubular washer 42 that is used to cover the bottom portion of lug nut 34. Washer 42 covers the wrench lands (not shown) to prevent theft by using a straight wrench underneath the edge of the lug nut cover 12.

FIG. 8 shows a typical wheel 13 with lug bolt holes 40 and a circular opening 17 in the center of the wheel 13.

FIG. 9 shows the special lug nut 34, a portion of the wheel 13, the lug bolt 39 and a portion of the vehicle 41 that holds the lug bolt 30. Tubular washer 42 is also shown in this view. This view is exploded to show how these components fit. In some special cases, the lug bolt is threaded into the vehicle structure 41. In this case, the lug nut 34 will be supplied with an external threaded adapter (not shown) which will join the internal threads of the lug nut 34 to the internal threads of the vehicle structure 41.

The operation of the locking assembly of the present invention is relatively easy. A four, five or six lug bolt mounting bracket and lug nut cover is first selected. The mounting bracket 15 is placed on the vehicle, in the preferred embodiment, over the lug bolts 39. Next the vehicle wheel 13 is mounted on top of the mounting bracket 15 with a portion of the mounting bracket 22 and 24 extending through the center 17 of the wheel wheel 13. The special lug nuts 34 are mated to the lug bolts 39 with tubular washer 42 therebetween and the lug nuts 34 are securely tightened. Sleeve 23 is then placed inside the lug nut cover 12 and the set screws in the preferred enbodiment are slightly tightened such that the sleeve 23 will stay in one position but can be moved by a slight force. The lug nut cover 12 containing locking means 26 is then firmly placed on the lug nut extension 36 until the locking tangs 30 are fitted under the mounting bracket edge 24 of the mounting bracket 22. The sleeve 23 is then moved down against the wheel 13. The lug nut cover 12 is then removed by turning key 28 which retracts tangs 30 and the set screws 25 are securely tightened. The cover 12 is thereafter placed back on the lug nut extensions 36 with the locking tangs 30 fitted firmly under the mounting bracket edge 24.

Accordingly, there has been provided, in accordance with the invention, a locking assembly for a vehicle wheel that fully satisfies the objectives set forth above. It is understood that all terms used herein are descriptive rather than limiting. While the invention has been described in conjunction with specific embodiments, it is evident that many alternatives, modifications, and variations will be apparent to those skilled in the art in light of the disclosure herein. Accordingly, it is intended to include all such alternatives, modifications, and variations that fall within the spirit and scope of the appended claims.

What is claimed is:

1. A locking assembly for locking a lug nut cover on a vehicle wheel secured to a vehicle comprising:
    a vehicle wheel having a circular opening in the center of said vehicle wheel;
    a plurality of lug bolts containing external threads for securing said vehicle wheel to said vehicle;
    a mounting bracket having a plurality of arms, said mounting bracket being placed between said vehicle wheel and said vehicle, said arms containing an alongated hole to fit over said bolts whereby the inner portion of said mounting bracket protrudes through said circular opening located in said vehicle wheel, said elongated hole in said mounting bracket being designed to accommodate a plurality of lug bolt spacings measured from the center of said vehicle wheel to the center of said lug bolts;
    a circular sleeve fitted over said mounting bracket, said circular sleeve held in place by at least two set screws;
    a lug nut cover with a plurality of arms, having a front side and a back side, said lug nut cover containing elongated slots on the back side of said lug nut cover with flexible elongated hollow inserts fitted inside said elongated slots in said lug nut cover, said inserts, containing circumferential grooves on the internal surface of said insert, said elongated slots fitted with said elongated flexible inserts on the backside of said lug nut cover, being designed to accommodate a plurality of lug bolt spacings, measured from the center of said vehicle wheel to the center of said lug bolts;
    a plurality of lug nuts having a bottom and a top;
    a plurality of tubular washers, said tubular washers covering the bottom portion of said lug nuts and fitted between said lug nut and said wheel;
    a circular lug nut extension, located on the top of said lug nuts, said circular extension containing circumferential ridges whereby slots containing circumferential grooves will produce a firm fit without any sideways movement when said circumferential ridges communicate with said circumferential grooves;
    locking means to secure said lug nut cover to said mounting bracket whereby said locking means will hold said lug nut cover firmly and securely in place;

2. A locking assembly as described in claim 1 wherein each of said elongated slots in said mounting bracket is an elliptically shaped slot, said elliptically shaped slot having an semi-major axis that passes longitudinally and symetrically through the center of each end of said slot whereby an extension of said semi-major axis will pass through the center of said vehicle wheel.

3. A locking assembly as described in claim 1 wherein said circular sleeve fitted inside said lug nut cover is partially held in place by at least two set screws whereby said circular sleeve and said lug nut cover are both pressed firmly and fitted against said wheel and thereafter when said circular sleeve and said lug nut cover are simultaneously removed, allows said set screws to be completely tightened against said circular sleeve.

4. A locking assembly for locking a lug nut cover on a vehicle wheel secured to a vehicle comprising:
    a vehicle wheel having a circular opening in the center of said wheel;
    a plurality of lug bolts containing external threads for securing said vehicle wheel to said vehicle;
    a mounting bracket having a plurality of arms, said mounting bracket placed between said vehicle wheel and said vehicle, said arms containing an elongated hole to fit over said lug bolts whereby the inner portion of said mounting bracket protrudes through said circular opening located in said vehicle wheel as said wheel is placed over said lug bolts, said inner portion protruding through said vehicle wheel having the edge turned inward to receive the tangs of said locking means, said elongated hole in said mounting bracket being designed to accommodate a plurality of lug bolt spacings measured from the center of said vehicle wheel to the center of said lug bolts;
    a circular sleeve fitted over said mounting bracket, said circular sleeve held in place by at least two sets screws;
    a lug nut cover with a plurality of arms having a front side and a back side, said lug nut cover containing elongated slots on the back side of said lug nut cover with flexible elongated hollow inserts fitted inside said elongated slots in said lug nut covered, said inserts containing circumferential grooves on the internal surface of said insert, said elongated slots, fitted with said elongated flexible inserts on the backside of said lug nut cover, being designed to accommodate a plurality of lug bolt spacings measured from the center of said vehicle wheel to the center of said lug bolts;

a plurality of hexagon shaped lug nuts having internal threads that mate with said external threads of said lug bolts, said lug nuts also having a bottom and a top, said bottom portion of said lug nuts being covered by a tubular washer that fits between said lug nuts and said wheel, said lug nuts having a circular extension located on the top of said lug nuts, said circular extension containing circumferential ridges whereby said circular lug nut extension when fitted into said flexible elongated slots will produce a firm fit without any sideways movement when said circumferential ridges communicate with said circumferential grooves;

locking means to secure said lug nut cover to said mounting bracket, said locking means utilizing a unique key to activate said lock mechanism of said locking means, said lock mechanism having at last two tangs that fit under said edges of said mounting bracket protruding through the center of said wheel, whereby when said unique key activates said lock mechanism which moves at least two spring biased tangs to fit under said edges of said mounting bracket protruding through the center of said vehicle wheel, said locking means will hold said lug nut cover firmly and securely in place.

5. A locking assembly as described in claim 4 wherein each of said elongated slots in said mounting bracket is an elliptically shaped slot, said elliptically shaped slot having a semi-major axis that passes longitudinally and symetrically through the center of each end of said slot whereby an extension of said semi-major axis will pass through the center of said vehicle wheel.

6. A method for locking a lug nut cover on a vehicle wheel secured to a vehicle comprising:

providing a vehicle wheel with a circular opening in the center of said vehicle wheel;

providing a plurality of lug bolts containing external threads for securing said vehicle wheel to said vehicle;

providing a mounting bracket having a plurality of arms, said mounting bracket placed between said vehicle wheel and said vehicle, said arms containing an elongated hole to fit over said lug bolts, whereby the inner portion of said mounting bracket protrudes through said circular opening located in said vehicle wheel as said wheel is placed over said lug bolts in said vehicle, said elongated hole in said mounting bracket being designed to accommodate a plurality of lug bolt spacings measured from the center of said vehicle wheel to the center of said lug bolts;

providing a circular sleeve fitted over said mounting bracket, said circular sleeve held in place by at least two set screws;

providing a lug nut cover with a plurality of arms having a front side and a back side, said lug nut cover containing elongated slots on the back side of said lug nut cover with flexible elongated hollow inserts fitted inside said elongated slots in said lug nut cover, said inserts containing circumferential grooves on the internal surface of said insert, said elongated slots, fitted with said elongated flexible inserts on the backside of said lug nut cover, being designed to accommodate a plurality of lug bolt spacings measured from the center of said vehicle wheel to the center of said lug bolts;

providing a plurality of lug nuts having internal threads that mate with said external threads of said lug bolts, said lug nuts also having a bottom and a top;

providing a plurality of tubular washers, said tubular washers covering the bottom portion of said lug nuts and fitted between said lug nut and said wheel;

providing a circular lug nut extension, located on the top of said lug nuts, said circular extension containing circumferential ridges whereby said circular lug nut extension when fitted into said flexible elongated slots will produce a firm fit without any sideways movement when said circumferential ridges communicate with said circumferential grooves;

providing locking means to secure said lug nut cover to said mounting bracket whereby placing said mounting bracket on said vehicle lug bolts;

placing said vehicle wheel over said mounting bracket on said lug bolts, placing said lug nuts including said lug nut extension on said lug bolts, tightening said lug nuts;

placing said circular sleeve in said lug nut cover and partially tightening said set screws; placing said lug nut cover and said circular sleeve combined on said lug nut extensions wherein said lug nut cover is pressed firmly and fitted against said wheel; removing said lug nut cover and completely tightening said set screws against said circular sleeve; placing said lug nut cover and said locking means in said lug nut extension; activating said lock mechanism with a unique key whereby the activation of said lock mechanism moves at least two spring biased tangs to fit under the edge of said mounting bracket protruding through the center of said vehicle wheel thereby holding said lug nut cover firmly in place.

7. A method for locking a lug nut cover as described in claim 6 each of said elongated slots in said mounting bracket is an elliptically shaped slot, said elliptically shaped slot having a semi-major axis that passes longitudinally and symetrically through the center of each end of said slot whereby an extension of said semi-major axis will pass through the center of said vehicle wheel.

* * * * *